United States Patent [19]

Houghton et al.

[11] Patent Number: 6,009,153
[45] Date of Patent: *Dec. 28, 1999

[54] ELECTRONIC DEVICES AND PROGRAMMING METHODS THEREFOR

[75] Inventors: Thomas Francis Houghton, Flanders; Edward Stanley Szurkowski, Maplewood; William Philip Weber, Jr., Flemington, all of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/862,558

[22] Filed: May 23, 1997

[51] Int. Cl.$^6$ ............... H04M 11/00; H04M 1/64
[52] U.S. Cl. ............... 379/102.02; 379/100.01; 379/88.23
[58] Field of Search ............ 379/102.01–102.07, 379/100.01, 67, 88, 100.09, 93.29–93.32, 88.23, 200, 201; 364/138, 186; 370/402

[56] References Cited

U.S. PATENT DOCUMENTS

| | | | |
|---|---|---|---|
| 4,893,335 | 1/1990 | Fuller et al. | 379/200 |
| 5,007,429 | 4/1991 | Treatch et al. | 128/677 |
| 5,201,067 | 4/1993 | Grube et al. | 455/89 |
| 5,301,223 | 4/1994 | Amadon et al. | 379/58 |
| 5,414,751 | 5/1995 | Yamada | 379/58 |
| 5,414,756 | 5/1995 | Levine | 379/67 |
| 5,442,541 | 8/1995 | Hube et al. | 364/138 |
| 5,537,643 | 7/1996 | Indo et al. | 346/186 |
| 5,555,288 | 9/1996 | Wilson et al. | 379/102.02 |
| 5,596,628 | 1/1997 | Klein | 379/102.02 |
| 5,600,711 | 2/1997 | Yuen | 379/102.07 |
| 5,636,216 | 6/1997 | Fox et al. | 370/402 |
| 5,729,596 | 3/1998 | Reeder et al. | 379/102.04 |

FOREIGN PATENT DOCUMENTS

| | | | |
|---|---|---|---|
| 0 478 231 | 9/1991 | European Pat. Off. | H04Q 7/04 |
| WO 97 16938 | 5/1997 | WIPO | H04Q 7/32 |
| WO 97 50222 | 12/1997 | WIPO | H04M 1/00 |

*Primary Examiner*—Curtis A. Kuntz
*Assistant Examiner*—George Eng
*Attorney, Agent, or Firm*—Donald P. Dinella; Robert E. Rudnick

[57] ABSTRACT

A technique for programming operating parameters in an electronic device, such as programmable configuration settings, uses an interactive response configuration server accessible through the telephone network. The configuration server provides voice prompts to an electronic device operator over a telephone connection. The voice prompts concern a desired manner of operation achievable with particular operating parameter settings. Desired operating parameter settings are determined based on the operator's responses. A programming signal including representations of the desired operating parameter settings is then generated and transmitted to the electronic device. The electronic device then sets the values of its programmable operating parameters in accordance with the received programming signal.

23 Claims, 3 Drawing Sheets

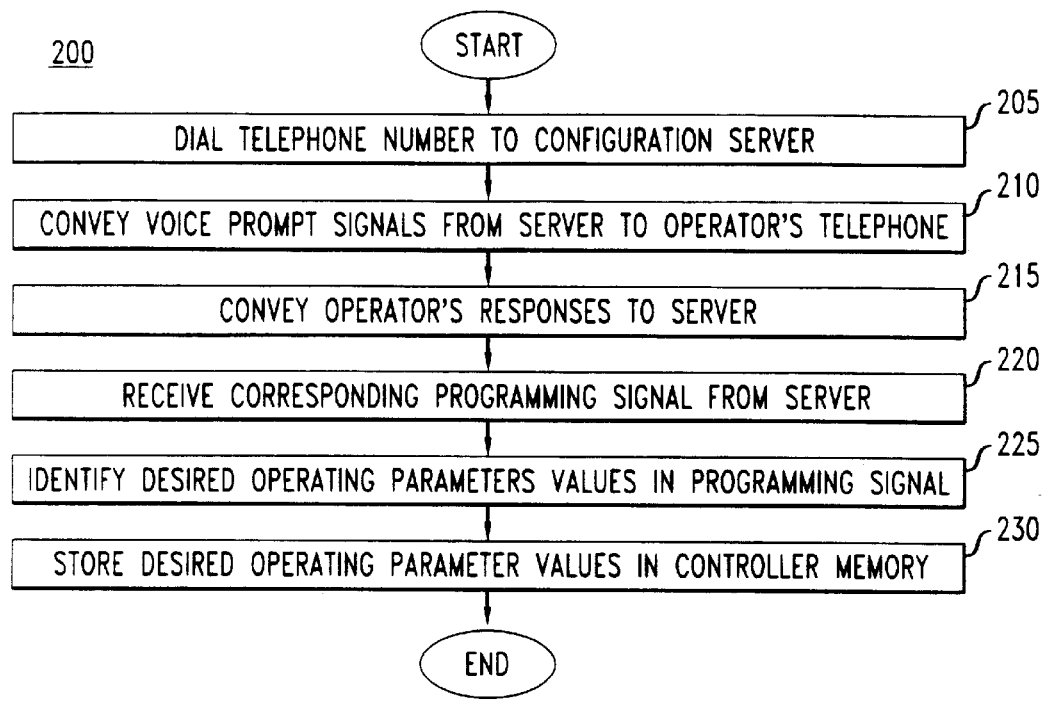
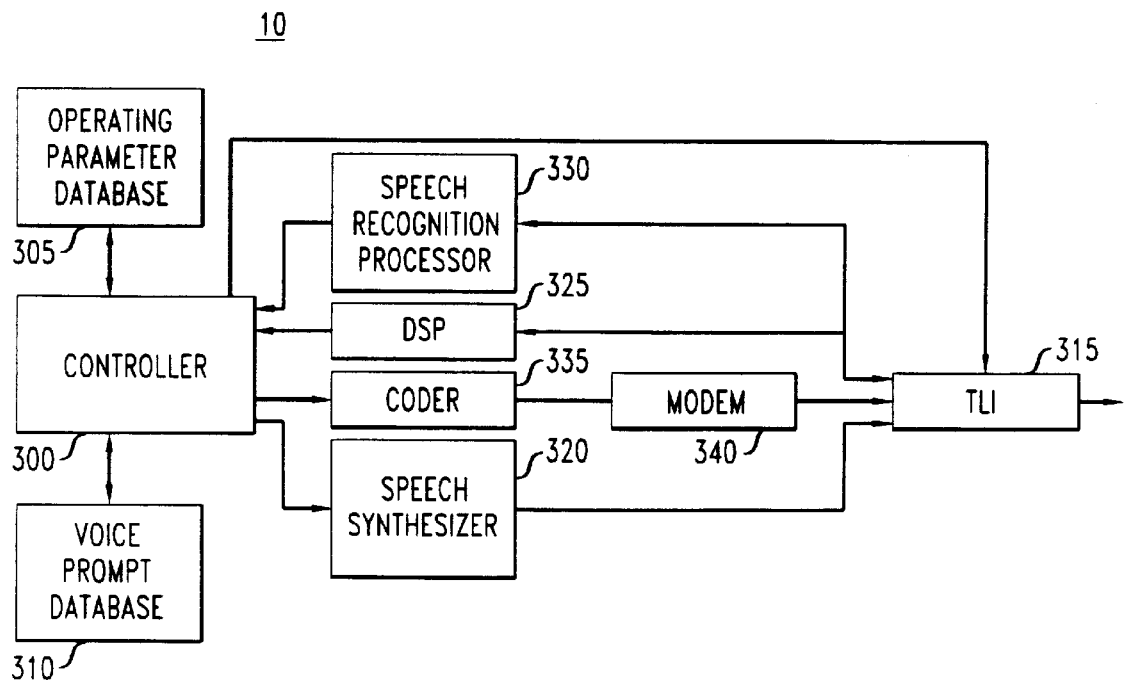

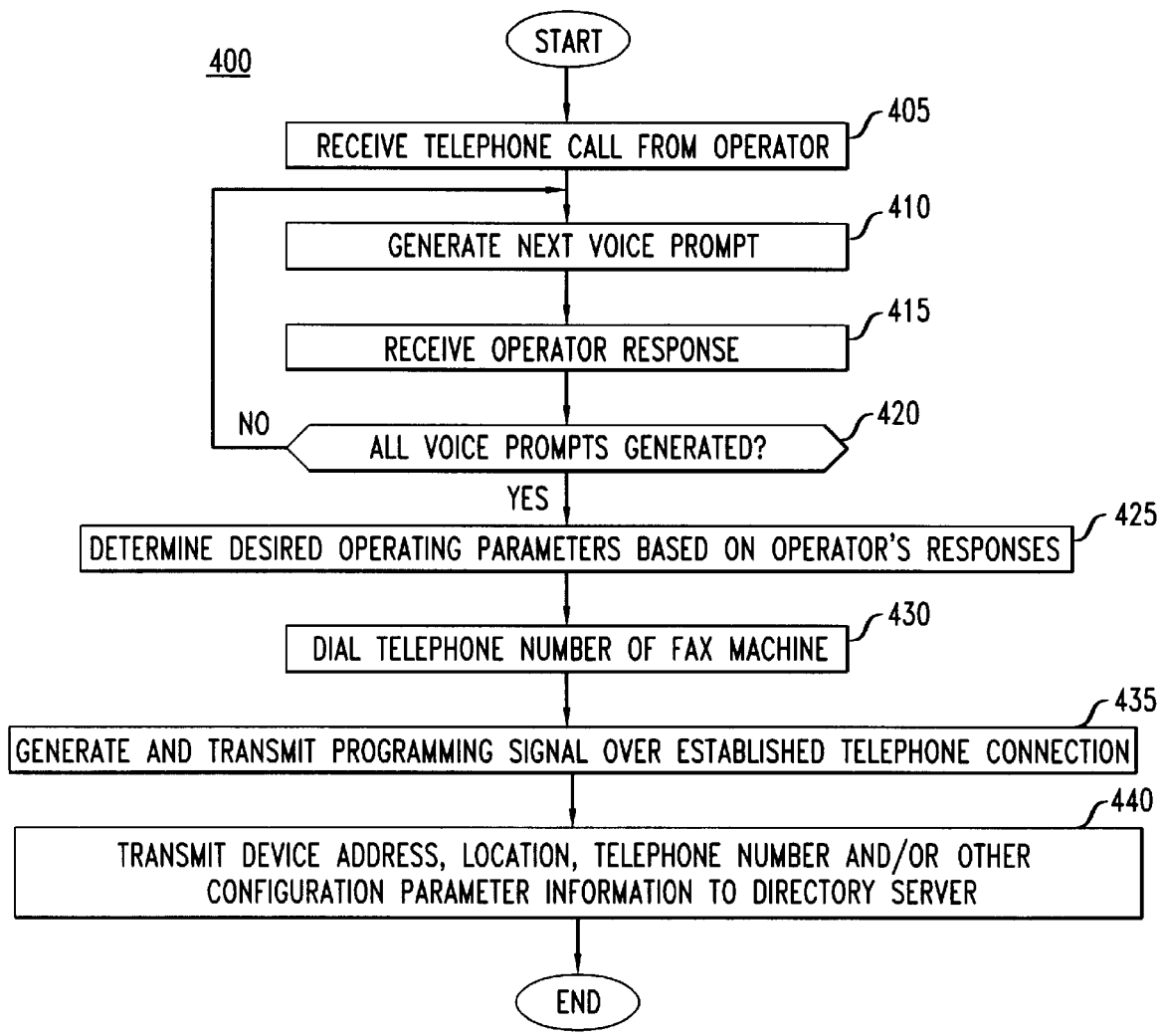

ELECTRONIC DEVICES AND PROGRAMMING METHODS THEREFOR

FIELD OF THE INVENTION

The invention relates to electronic device programming.

BACKGROUND OF THE INVENTION

Many communication devices, such as facsimile (fax) machines, private branch exchange (PBX) equipment, radio telephones including cellular and PCS telephones, require users to enter initial configuration information, such as telephone numbers, names, passwords, account numbers and other programmable settings before the device can operate in a desired manner. Typically, consumer-oriented communication devices employ keypads and displays to enable the entering of configuration information by a user. For many consumers, entering configuration information using a keypad and display can be confusing and, more often, undesirably burdensome. Also, the configuration keypad and display may provide little or no use during operation of a communication device beyond the initial and/or infrequent configuration programming. As a consequence, the inclusion of such components in cost-sensitive consumer-oriented devices is considered relatively costly in view of the one-time or infrequent use.

Alternative methods for entering configuration information include attaching a personal computer (PC) to the electronic device and executing configuration software in the PC provided by the device manufacturer. Such configuration programming is often used for telephone network devices including, for example, particular types of network routers. Configuration programming using an attached PC is often less burdensome to use relative to configuration keypad and display. Moreover, configuration programming using a PC advantageously enables reduced manufacturing costs for the device due to the omission of the configuration keypad and display. However, such a programming method is undesirable for users who do not own or have access to personal computers such as, for example, a large number of purchasers of consumer-oriented electronic devices.

Accordingly, a recognized need exists for a relatively low cost and easy to use programming technique that does not require special programming equipment.

SUMMARY OF THE INVENTION

The invention is based on an advantageous programming technique for setting operating parameters in an electronic device, such as programmable configuration settings, using an interactive configuration server accessible through the telephone network. More specifically, the configuration server provides voice prompts to an operator of the electronic device over a telephone connection. The voice prompts concern a desired manner of operation achievable with particular operating parameter settings. Desired operating parameter settings are determined based on the operator's responses. A programming signal including a representation of the desired operating parameter settings is then generated and transmitted to a destination electronic device. The destination electronic device sets the values of its programmable operating parameters in accordance with the received programming signal.

Such a programming technique provides enhanced programming ease for the device operator. Moreover, it is advantageously possible to employ relatively low cost components in the electronic device for enabling programming in this manner. In particular, it is possible for an electronic device according to the invention to include a programming controller and telephone line interface to perform the needed operations to receive and store the operating parameters. The device configuration server can also be provided at relatively low cost as a computer having an interface to the public switched telephone network (PSTN) and corresponding voice prompt and operating parameter databases.

It is alternatively possible for the electronic device operator to contact the configuration server using a different telephone line than the telephone line used for the electronic device. Accordingly, after the configuration server has determined the desired operating parameters based on the operator's responses from this remote telephone line, the configuration server automatically calls the telephone number of the electronic device and establishes a connection before the programming signal representing the operating parameters is transmitted.

The technique of the invention is advantageously useable for programming a variety of telecommunication devices including, for example, facsimile machines, facsimile routers, private branch exchanges, answering machines, cable modems, radio telephones including cellular and PCS telephones. Moreover, a dedicated telephone line is not required for electronic device programming according to the invention. It is possible to attach a telephone line to the device as needed, when programming is desired. As a consequence, the programming technique of the invention is also useable in other types of electronic devices including video cassette recorders, video cameras, televisions, audio and multimedia equipment as well as other programmable electronic devices such as home appliance controllers and security systems, and cable and satellite television set-top controllers providing, for example, television-based internet access.

Additional features and advantages of the invention will become more readily apparent from the following detailed description and accompanying drawings.

BRIEF DESCRIPTION OF THE DRAWINGS

FIG. 3 illustrates a flow diagram of an exemplary method performed by the facsimile device of FIG. 2 for programming operating parameters in accordance with the invention;

FIG. 4 illustrates a schematic block diagram of an exemplary component arrangement for the configuration server of FIG. 1; and FIG. 5 illustrates a flow diagram of exemplary operations performed by the configuration server of FIG. 4 for programming operating parameters of an electronic device in accordance with the invention.

DETAILED DESCRIPTION

Figure 1:
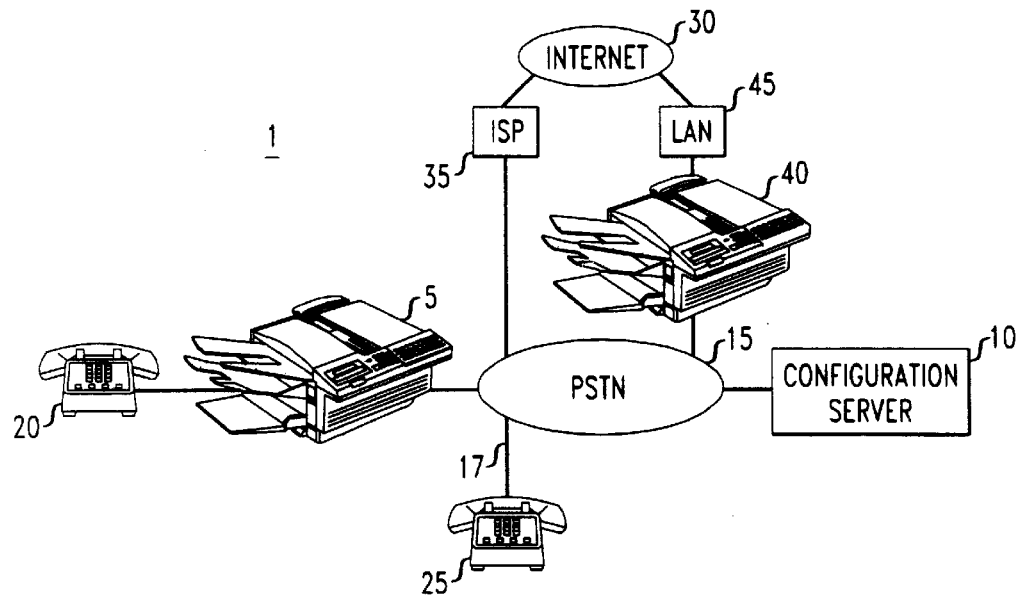
FIG. 1 illustrates a schematic block diagram of an exemplary electronic facsimile device and configuration server connected to a telephone network for programming the device in accordance with the invention.

FIG. 1 shows an exemplary arrangement 1 for programming a facsimile transmission device (fax machine) 5 using a configuration server 10 over a public switched telephone network (PSTN) 15 in accordance with the invention. Telephones 20 and 25 are connected to the fax machine 5 and PSTN 25, respectively, and enable an operator to communicate with the configuration server 10 for programming the fax machine 5.

The depiction of the facsimile device 5 for an electronic device that is programmable in accordance with the invention is for illustration purposes only and not meant to be a limitation of the invention. The invention is directed to an electronic device having particular programming features and components that enable the setting of the device's operating parameters. However, the particular function performed by operation of the electronic device is not critical to practicing the invention. Accordingly, the technique of the invention is advantageously useable for programming a variety of telecommunication devices including, for example, facsimile routers, private branch exchanges, answering machines, cable modems, radio telephones including cellular and PCS telephones. Moreover, the programming technique is also useable for programming electronic devices not typically considered telecommunication devices including, for example, video cassette recorders (VCR), video cameras, televisions, audio equipment and other multimedia equipment and controllers such as home appliance controllers and security systems, and cable and satellite television set-top controllers providing, for example, television-based internet access. For such devices, it is possible to attach a telephone line to the device only as needed, when programming is desired.

Also, although the fax machine 5 communicates with the configuration server 10 over a wired telephone network, e.g., the PSTN 15, it is alternatively possible for the fax machine 5 to communicate with the configuration server 10 over a wireless telephone network, such as a cellular or PCS network, or a combination of wireless and wired telephone networks according to the invention.

For clarity of explanation, the fax machine 5 has the capability that enables facsimile data signal transmissions to be alternatively routed over a data network such as, for example, Internet 30, or over the PSTN 15 to facilitate reduced facsimile transmission costs. In FIG. 1, an exemplary Internet Service Provider (ISP) 35 provides access between the PSTN 15 and Internet 30. Also, a second fax machine 40 is connected to the PSTN 15 as well as the Internet 30 through a local area network (LAN) 45.

In transmitting a facsimile data signal representing a document from the fax machine 5 to the fax machine 40, the fax machine 5 determines the less costly route for the signal between routes over the PSTN 15 or the alternate data network. Such cost determination is based on, for example, the location of the recipient, the time of day and day of the week, and a toll rate schedule for the PSTN 15 and alternate data network. It is possible for the fax machine 5 to gain access to the alternate data network in a conventional manner such as establishing a telephone connection with the ISP 35 over the PSTN 15 by dialing a toll-free number and using Internet telephony hardware and/or software manufactured by, for example, Lucent Technologies Inc., Murray Hill, N.J. In an alternative arrangement, a fax machine can access an alternate data network through a local area network such as the arrangement shown for the fax machine 40 and LAN 45.

The added capability for alternate data network routing requires the fax machine 5 to possess a relatively large number of programmable operating parameters. Exemplary operating parameters for the fax machine 5 include conventional fax machine parameters such as time, date, name, telephone number, communication protocols, stored telephone numbers for repertory dialing, as well as parameters relating to accessing and using the alternate data network including telephone numbers or LAN addresses of communication servers for the alternate data network as well as toll charge rates for the PSTN and alternate data network transmission. The programming technique of the invention facilitates such operating parameter setting in an advantageous manner.

In accordance with the invention, programming the operating parameter settings is performed by the fax machine operator dialing the telephone number of the configuration server 10 using the telephone 20 attached to the fax machine 5. It is possible for the telephone 20 to be a handset and dual-tone-multiple-frequency (DTMF) keypad integrated with the fax machine 5. The configuration server 10 is an interactive response system that provides voice prompts over the PSTN 15 to the operator regarding desired operating parameter settings and/or desired manners of operation for the fax machine 5. The operator responds to such voice prompts using the telephone keypad or voiced replies. The configuration server 10 determines the desired operating parameter settings based on the operator's responses.

A programming signal representing the desired operating parameter settings is then generated and transmitted to the fax machine 5 by the configuration server 10. The fax machine 5 receives the programming signal and stores the operating parameter settings according to the values represented in the signal. It is alternatively possible for an operator to program the fax machine 5 in a similar manner using the telephone 25 connected to the PSTN 15 by a telephone line 17 that is different than the telephone line connected to the fax machine 5 and telephone 20.

In such a remote telephone arrangement, the operator calls the configuration server 10 and responds to the voice prompts regarding the desired manner of operation as previously described with respect to using the telephone 20. However, in the remote telephone arrangement, the configuration server 10 dials the telephone number of the fax machine 5 and establishes a connection prior to transmitting the programming signal to the fax machine 5. Further, in this remote telephone arrangement, it is desirable for the programming signal to also contain an indicator, such as a signal header, identifying the signal as containing operating parameter settings.

It is further possible to provide a level of security for the operating parameter programming according to the invention by having the fax machine 5 and/or configuration server 10 perform processes for verifying that the operator attempting to program the fax machine has authority to perform such operation. Such security processes are useable, whether the operator is attempting to program the fax machine 5 using an attached handset and keypad or a remote telephone, to provide a level of protection against unauthorized modification of the fax machine's operating parameters. For instance, a security password or equivalent, known by the configuration server 10, can be given to an operator having programming authority. Then, upon establishing a connection between the operator and configuration server 10, the server 10 can request, receive and verify the security password, prior to transmitting the communication signal.

Figure 2:
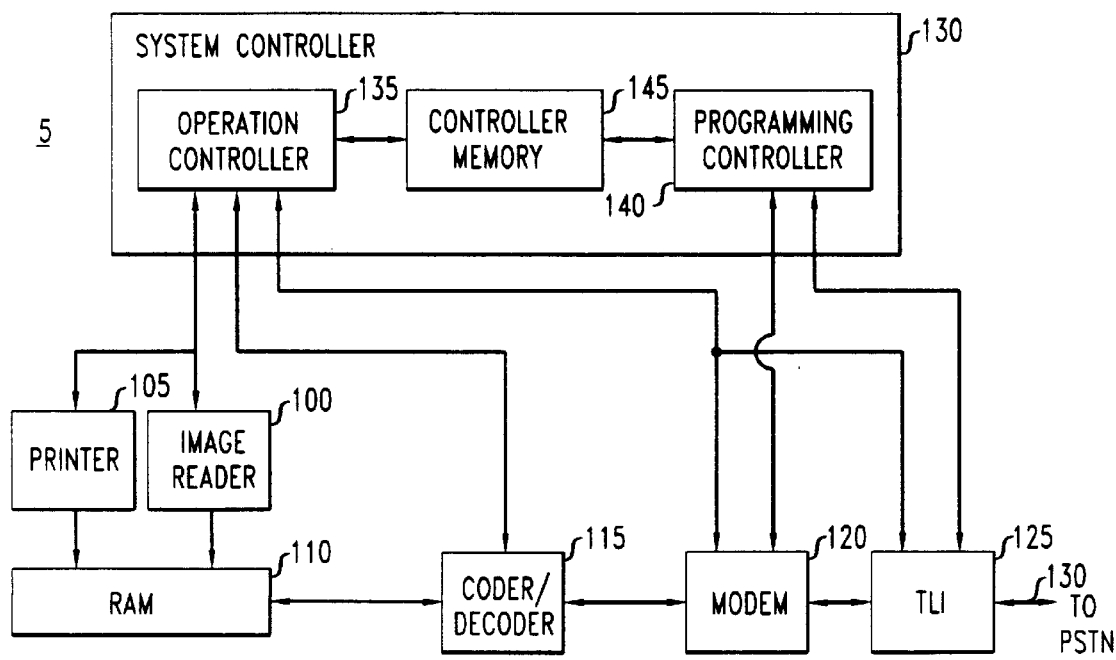
FIG. 2 illustrates a schematic block diagram of an exemplary component arrangement for the facsimile device of FIG. 1 in accordance with the invention.

FIG. 2 shows an exemplary configuration for the fax machine 5 in FIG. 1 to enable operating parameter programming in accordance with the invention. In FIG. 2, functional components are connected to an image reader 100 and printer 105 of the fax machine 5. For clarity of explanation, these functional components are represented by boxes in FIG. 1. The functions executed in these boxes can be provided through the use of either shared or dedicated hardware including, but not limited to, application specific integrated circuits, digital signal processors, processors or multiple processors executing software. Use of the term "processor" and "controller" and forms thereof should not be construed to refer exclusively to hardware capable of executing software and can be respective software routines performing the corresponding functions and communicating with one another.

More specifically, in FIG. 2, the fax machine 5 includes random access memory (RAM) 110 coupled to the image reader 100 and printer 105. The RAM 110 is further coupled to an exemplary encoder/decoder 115 for encoding image data read by the image reader 100 and for decoding image data received by the fax machine 5 to be printed by the printer 105. It is possible for such encoding and decoding to be data compression and decompression processes in accordance with conventional facsimile compression standards such as, for example, the ISO/CCITT Recommendation T.4 compression standard associated with the Recommendation T.30 facsimile standard described in *ITU-T Recommendation T4 Standardization of Group 3 Facsimile Apparatus for Document Transmission*, v. 7 (1996), which is incorporated by reference herein. It is also possible to omit the encoder/decoder 115 if encoding and decoding operations are performed by the operation controller 135.

The encoder/decoder 115 is also coupled to a modem 120 that is further coupled to a telephone line interface (TLI) 125. The modem 120 modulates image data signals for transmitting by the fax machine 5 and demodulates image data signals received by the fax machine 5. The TLI 125 is a coupling interface to a telephone line 130 connected to the PSTN 15 of FIG. 1. The TLI 125 is controlled by the controller 135 to perform calling operations to establish connections over the PSTN 15 or Internet 30, shown in FIG. 1, for transmitting facsimile data, as well as an off-hook operation for receiving a call from the PSTN 15, such as from another fax machine or from the configuration server 10 of FIG. 1. It is possible for the TLI 125 to include a conventional data access arrangement (DAA) for the TLI 125 such as, for example, the DAA's manufactured by Cermetek Microelectronics, Inc. of Sunnyvale, Calif.

A system controller 130 includes an operation controller 135 and a programming controller 140 coupled to an operating parameter memory 145. The programming controller 140 controls the operation of setting operating parameters stored in the controller memory 145 based on the method of the invention. An exemplary method performed by the programming controller 140 for setting the operating parameter data stored in the memory 145 according to the invention is described below with regard to FIG. 3.

The operation controller 135 controls the operations of the image reader 100, printer 105, encoder/decoder 115, modem 120 and TLI 125 for performing facsimile receive and transmit operations in a manner based on the operating parameter settings stored in the controller memory 145. The particular manner in which the operation controller 135 controls operations of the fax machine 5 is not critical to practicing the invention. It is possible for the operation controller 135 to control operations in a similar manner to that used in conventional facsimile transmission devices with the exception of enabling a facsimile document to be transmitted to a destination device over an alternative data network.

FIG. 3 shows an exemplary method 200 of the programming controller 140 for programming the operating parameter settings when a telephone is attached to the fax machine 5 as illustrated in FIG. 1. Referring to FIG. 3, the telephone number of the configuration server 10, shown in FIG. 1, is dialed for the operator in step 205. It is possible for the programming controller 140 to have access to a stored telephone number of the configuration server 10 to dial the server 10 for the operator, such as when the operator activates a programming button on the fax machine 5 or at initial power up of the machine 5. In the alternative, it is possible for the operator to directly dial the server's telephone number in step 205.

Upon establishing a telephone connection, the configuration server 10 transmits voice prompts over the telephone connection. The fax machine 5 then conveys these voice prompts to the operator in step 210. Then, in step 215, responses to the voice prompts by the operator are conveyed to the server 110. It is possible for the operator to respond to such voice prompts by, for example, generating DTMF tones using a keypad of the telephone 20, and/or speaking responses to be processed by a speech recognition processor in the configuration server 10. The configuration server 10 then determines corresponding desired operating parameter settings based on the operator's responses and generates a programming signal containing a representation of the desired operating parameter settings. This generated programming signal is transmitted to the fax machine 5 over the established telephone connection.

The fax machine receives the transmitted programming signal in step 220. Then, in step 225, the desired operating parameter settings represented therein are identified by the programming controller 140, shown in FIG. 2. The identified operating parameter settings are then stored in the controller memory 145, shown in FIG. 2, in step 230.

Accordingly, the programming method of the invention facilitates a relatively easy process for setting operating parameters that can be implemented in electronic devices, such as a fax machine, at relatively low cost. In particular, as shown in FIG. 2, it is possible to implement the method of the invention by only adding a programming controller with access to a telephone line interface of the electronic device. Further, it is advantageous for the operations of such a programming controller and a corresponding operation controller of an electronic device to be included within a single system controller processor or ASIC.

It is also possible for an operator to perform such programming of operating parameter settings according to the invention using a telephone connected to a different telephone line than the fax machine 5, such as the telephone 25, shown in FIG. 1. It is possible to employ a method substantially similar to the method 200 of FIG. 3 for performing such remote telephone programming. More specifically, step 205 of dialing the telephone number of the configuration server 10, shown in FIG. 1, is performed by the operator from the remote telephone. The configuration server 10 than transmits corresponding voice prompts to the operator and determines desired operating parameter settings based on the operator's responses as in the method 200.

However, steps 210 and 215 for conveying the voice prompt signals and corresponding operator's responses via the fax machine 5 are omitted. Instead, after the configuration server 10 determines the desired operating parameter settings based on the operator's responses, it must dial the telephone number of the fax machine 5 prior to transmitting the generated programming signal containing the determined operating parameter settings. Then, the fax machine 5 can perform steps 220, 225 and 230 for receiving the programming signal, and identifying and storing the desired operating parameter settings contained therein.

Numerous techniques are useable by the programming controller 140, shown in FIG. 2, to detect that a programming signal with operating parameter settings is being received. However, the particular technique employed is not critical to practicing the invention. Exemplary techniques for detecting that a programming signal is being received includes providing an indicator in the programming signal, such as in a signal header or initial tone, identifying that the signal is a programming signal. In the alternative, it is possible for the fax machine 5 to make such a determination based on a stored address in the device's memory that corresponds to an automatic number identifier (ANI) of the calling configuration server 10 provided by a switch of the PSTN 15.

FIG. 4 illustrates an exemplary component arrangement of the configuration server 10 of FIG. 1. Such an arrangement can be provided, for example, by a conventional personal computer or computer server. As in FIG. 2, the functional components of the arrangement of FIG. 4 are represented as boxed for clarity of explanation. Accordingly, the functions executed in these boxes can be provided through the use of either shared or dedicated hardware including, but not limited to, application specific integrated circuits, digital signal processors, microprocessors or multiple processors executing software.

In FIG. 4, the server 10 includes a controller 300 connected to operating parameter and voice prompt databases 305 and 310. The voice prompt database 310 contains entries representing respective voice prompts for the operator for programming the fax machine 5. It is possible for such database entries to be digitized speech for the respective voice prompts or digitized speech phonemes or segments of speech that when concatenated in a particular order produce the desired voice prompts. The operating parameter database 305 contains data entries for the possible operating parameter settings that can be used in the fax machine 5. The configuration server 10 relies on the entries in this database for generating the previously described programming signal.

The controller 300 is connected to a TLI 315 for establishing a connection in response to an operator calling the server 10 and, optionally, for dialing an electronic device to be programmed. A speech synthesizer 320 is connected between the controller 300 and the TLI 315. The speech synthesizer 320 is used by the controller 300 for producing the voice prompt signals based on entries in the voice prompt database 305. It is alternatively possible to employ a different type of audio signal generator instead of the speech synthesizer 320 for generating the desired voice prompts in accordance with the invention.

A digital signal processor (DSP) 325 and speech recognition processor (SRP) 330 are also connected between the controller 300 and TLI 315 for processing operators' responses in a form suitable for reading by the controller 300. For instance, it is possible for the DSP 325 to detect DTMF tones received when an operator responds to a voice prompt using the telephone keypad. In a similar manner, the SRP 330 processes voiced responses received by the operator. The particular type of speech recognition processor used for the SRP 330 is not critical to practicing the invention. Speech recognition processors useable for the SRP 330 include, for example, conventional speech recognition processors such as the CONVERSANT® system manufactured by Lucent Technologies Inc. Further, it is possible to omit the SRP 330 if voiced responses are not accepted by the configuration server 10.

In addition, an encoder 335 and modem 340 are also connected between the controller 300 and TLI 315 for transmitting the programming signal to the fax machine 5. The particular representation of the desired operating parameter settings contained in the programming signal is not critical to the invention as long as such representation is readable by an electronic device. It is possible to use a conventional modem data signal format for the programming signal such as, for example, V.34, V.32, Bell 212A and 103, V.22 bis, V.23 and V.21, or sequences of DTMF tones or other data conveyance protocols such as low bit-rate frequency shift keying for generating the programming signal transmitted to an electronic device in accordance with the invention.

FIG. 5 depicts an exemplary method 400 for the configuration server 10 of FIGS. 1 and 4 for programming an electronic device such as the fax machine 5 of FIGS. 1 and 2. Referring to FIG. 5, the configuration server 10 receives a telephone call from an electronic device operator in step 405. The controller 300, shown in FIG. 4, then causes the speech synthesizer 320 to generate a voice prompt concerning desired operation of the electronic device and/or a desired operating parameter setting in step 410 and the server receives the operators response in step 415. If the response is in the form of a DTMF signal, then the DSP 325, shown in FIG. 4, processes the signal and provides the corresponding information to the controller 300. If the response was a voiced speech signal, then the signal is processed by the SRP 330.

Then, in step 420, the method 400 proceeds to step 410 to transmit another voice prompt if additional information is needed from the operator. However, if additional information is not needed from the operator, the method 400 proceeds from step 420 to step 425. In step 425, desired operating parameter settings for the electronic device are determined based on the operator's responses. If the operator's responses concerns a desired operating setting, then the determination step 425 only includes the processing of the operator's response to identify which setting has been selected. The controller 300 then causes the TLI 315 to dial the telephone number of the destination electronic device in step 430. It is possible for this telephone number to be obtained from the operator in response to a corresponding voice prompt transmitted in step 410.

After a telephone connection has been established with the destination electronic device in step 430, the controller 300 generates the programming signal and transmits it to the device over the established telephone connection in step 435. For example, the controller 300 first generates a signal representing the determined operating parameter settings which is encoded by the encoder 335 and modulated by the modem 340 to form the programming signal that is transmitted to the destination electronic device. It should be readily understood that step 430 of dialing the destination electronic device can be omitted if the operator called the configuration server 10 from a telephone attached to the destination electronic device, such as the telephone 20 attached to the fax machine 5 in FIG. 1. In such instance, the programming signal is transmitted over the same telephone connection that is used for transmitting the voice prompts and corresponding operator responses.

After the programming signal is transmitted in step 435 in FIG. 5, the method 400 performs an optional step 440 of transmitting device, address, location, telephone number information and/or other configuration parameter information to a directory server that maintains at least one database of cross-reference tables of addresses such as IP addresses, locations and/or telephone numbers for respective devices. Conventional directory services such as, for example, InterNic—a cooperative activity between the National Science Foundation, AT&T and Network Solutions, Inc., maintain a server database of domain names and corresponding IP network number assignments. The InterNic directory server enables individuals to access and communicate with a particular electronic device over the internet conveniently based on the registered domain name for that device instead of the corresponding IP address. In a conventional manner, users are required to disadvantageously manually register or update information such as the domain name and the IP address with such directory servers by, for example, accessing the directory server from the internet at the domain name "www.internic.net".

In contrast, step 440 enables such updating or registration with a directory server to be performed automatically by the configuration server in accordance with the invention based on operator responses received in step 415. Accordingly, step 440 advantageously provides updating and registering information with directory servers in accordance with the invention without burdening the user to perform the burdensome manual registration. It is alternatively possible to perform the method 400 without step 440 in accordance with the invention.

Moreover, the process steps of the method 400 have been shown in a particular order for illustration purposes only. It is possible to perform several of the steps in a different order or concurrently. For instance, the determination step 425 can be performed in a concurrent or overlapping manner with voice prompt and operator response receiving steps 410 and 415.

Although the invention has been described with respect to a fax machine capable of routing facsimile data over an alternate data network, it should be readily understood that the programming technique of the invention is useable on more conventional fax transmission devices as well as other telecommunication devices including, for example, answering machines, fax routers, cable modems, radio telephones such as cellular and PCS wireless telephones that have access to a telephone network. Moreover, the invention is advantageously further useful for programming electronic devices that are not typically considered telecommunication devices such as, for example, video cassette recorders (VCR), camcorders, audio equipment including receivers and preamplifiers. However, an interface to a telephone line, such as a conventional RJ-11 telephone jack, would be required in such devices to enable communication between the programming controller of such devices and the configuration server over a telephone network. Also, in such devices, a telephone line need only be connected to the interface once or infrequently for a relatively short time duration to enable receipt of the programming signal.

The invention has been described with regard to operating parameters that concern programmable configuration of an electronic device including, for example, date, time, name, selected communication protocols, directory of frequently dialed telephone numbers, selectable methods of alerting the operator of particular device conditions such as particular audible alerts for an out-of-paper condition in a fax machine, as well as other pre-set parameters such as antenna options for a VCR or AM/FM tuner. This description of the invention with regard to setting an electronic device's programmable configuration is for illustration purposes only and it is possible to perform other types of programming according to the invention. For instance, it is possible for an operator to program a VCR to record a particular television show, or for an audio cassette deck to record a particular radio broadcast using the programming technique of the invention.

Although several embodiments of the invention have been described in detail above, many modifications can be made without departing from the teaching thereof. All of such modifications are intended to be encompassed within the following claims. For instance, it is possible for a single configuration server to program different types of electronic devices based on an operator's response identifying the particular type of device to be programmed. It is also possible for the configuration server to possess preset configuration operating parameter settings that can be recalled for a destination device by an operator opting for such preset configuration settings when prompted.

Moreover, operating parameter settings determined by the configuration server for a particular destination device can be optionally stored by the configuration server for later recall for reprogramming the particular destination device or programming a different destination device. Thus, upon a malfunction, such as power interruption or other event likely causing corruption of the stored operating parameters in the controller memory of the device, it is possible for the device to automatically place a telephone call to the configuration server and transmit a recall request signal to have its operating parameters recalled and re-transmitted to it.

The invention claimed is:

1. A configuration server method for programming an electronic device over a telephone network comprising:

establishing a first telephone connection in response to receiving an incoming call;

sending voice prompts to a source of said incoming call, said voice prompts concerning a desired operation of a destination electronic device;

receiving responses from said source in reply to said voice prompts;

determining desired operating parameters for said electronic device based on said received responses;

generating a programming signal including a representation of said desired operating parameters; and transmitting, over said first telephone connection, said programming signal from said configuration server to said destination electronic device and automatically establishing a second telephone connection between a directory server and said configuration server, and transmitting, over said second telephone connection, said programming signal from said configuration server to said directory server, said directory server using said programming signal to register said electronic device with a particular directory service associated with said directory server.

2. The method of claim 1 further comprising establishing a telephone connection between said configuration server and said destination electronic device by dialing a telephone number of said electronic device prior to transmitting said programming signal to said device.

3. The method of claim 1 wherein the telephone connection established in response to receiving an incoming call is established through said destination electronic device and wherein the programming signal is transmitted over this telephone connection.

4. The method of claim 1 wherein at least one of said responses is voiced speech from said source, said method further comprising speech recognition processing said voiced speech response.

5. The method of claim 1 wherein at least one of said voice prompts requests a selection of one of a plurality options and said response is a corresponding DTMF tone, said method further comprising processing to identify said selection.

6. The method of claim 1 wherein at least one of said voice prompts requests said source to select a particular operating parameter setting from a plurality of settings.

7. The method of claim 1 wherein said voice prompts and said operating parameter settings concern programming a telecommunication device.

8. The method of claim 7 wherein said voice prompts and said operating parameter settings concern programming a facsimile device.

9. The method of claim 1 wherein said voice prompts and said operating parameter settings concern configuration programming said destination electronic device.

10. The method of claim 1 wherein said generated programming signal includes a IP address and a domain name associated with said destination electronic device.

11. The method of claim 10 wherein said directory service is a Internet communications service, and said directory server includes at least one database for storing a domain name associated with said IP address, said domain name employed by a user of said Internet communications service for communicating with said destination electronic device.

12. A method for programming an electronic device and registering said electronic device with a directory server comprising:

establishing a first telephone connection in response to an incoming call from a device configuration server;

receiving a programming signal in said electronic device from said configuration server over said established telephone connection, said programming signal including a plurality of operating parameters which represent a desired programmable configuration of said electronic device;

detecting said desired operating parameter settings in said programming signal;

storing at least one of said detected operating parameter settings in memory; and automatically establishing a second telephone connection between said directory server and said configuration server, and transmitting, over said second telephone connection, said programming signal from said configuration server to said directory server to complete said registering of said electronic device with said directory server.

13. The method of claim 12 further comprising performing at least one operation in accordance with said stored operating parameter settings.

14. The method of claim 12 further comprising:

dialing a telephone number of a device configuration server over a telephone line;

receiving voice prompts from said server over a corresponding established telephone connection concerning a desired operation of said electronic device; and transmitting response signals to said server over said telephone connection corresponding to replies by an electronic device operator, wherein said correspondingly generated programming signal is received over said corresponding established telephone connection for said voices prompts and responses.

15. The method of claim 12 wherein said registering said electronic device is with at least one directory service maintained by said directory server.

16. The method of claim 12 further comprising:

in response to an event likely causing corruption of said stored operating parameters, dialing said configuration server telephone number over said telephone line;

transmitting a recall request signal over said telephone line after a connection has been established;

receiving said programming signal from said configuration server over said established telephone connection;

detecting said desired operating parameter settings in said programming signal; and storing at least one of said detected operating parameter settings in memory.

17. An electronic device comprising:

a modem for establishing a communication channel between said electronic device and a device configuration server;

a receiver for receiving a programming signal from said device configuration server over said communication channel, said programming signal including a plurality of operating parameter settings for operating said electronic device;

a detector for detecting said operating parameter settings in said programming signal; and a controller for configuring said electronic device as a function of said detected operating parameter settings and for automatically initiating a transmitting of said programming signal over a second communications channel from said configuration server to a directory server, said directory server using said programming signal to register said electronic device with a particular directory service maintained by said directory server.

18. The device of claim 17 wherein said programming signal is established through a plurality of voice prompts sent from said device configuration server to a user of said electronic device, each voice prompt of said plurality of voice prompts concerning a particular one operating parameter.

19. The device of claim 18 wherein said directory service is a Internet communications service, and said programming signal includes a IP address associated with said electronic device.

20. A telecommunications device comprising:

means for establishing a telephone connection in response to an incoming call from a device configuration server;

means for receiving a programming signal from said configuration server over said established telephone connection, said programming signal including a plurality of operating parameters which represent a desired programmable configuration of said electronic device;

means for detecting said desired operating parameter settings in said programming signal; and means for configuring said telecommunications device as a function of said desired operating parameter setting in said programming signal, and means for automatically initiating a transmitting of said programming signal from said configuration server to a directory server over a second telephone connection, said directory server using said programming signal to update a registration of said electronic device with a particular directory service maintained by said directory server.

21. The device of claim 20 further comprising means for storing at least one of said desired parameter settings.

22. The device of claim 21 wherein said directory service is a Internet communications service, and said programming signal includes a IP address associated with said electronic device.

23. The device of claim 22 wherein said directory server includes at least one database for storing a domain name associated with said IP address, said domain name employed by a user of said Internet communications service for communicating with said telecommunications device.

* * * * *